Patented Oct. 15, 1935

2,017,051

UNITED STATES PATENT OFFICE 2,017,051

SYNTHESIS OF AMINES

Herrick Ransom Arnold, Elmhurst, Del., and Thomas Leigh Williams, Fairville, Pa., assignors to E. I. du Pont de Nemours & Company, Wilmington, Del., a corporation of Delaware No Drawing. Application February 6, 1931, Serial No. 514,056

20 Claims. (Cl. 260—127)

This invention relates to an improved catalytic process for causing dehydration reactions to take place with organic hydroxy compounds. More particularly the invention relates to an improved process for the synthesis of amines.

Active carbon has been used extensively as an absorbent and decolorizing agent but only a limited use has been made of active carbon impregnated with inorganic materials. As an instance of such a use there may be mentioned the utilization of active charcoal impregnated with copper oxide for gas adsorption. In the application of Wilbur A. Lazier Serial No. 514,055 filed on even date herewith there is disclosed a process for producing amines, or for carrying out dehydration reactions generally with organic hydroxy compounds, by passing the vapors of such compounds over a heated catalyst comprising active carbon and a dehydrating agent. We have discovered, however, that the process disclosed in the above noted application may be improved, as will more fully appear hereinafter, by using substantially ash free active carbon prepared as disclosed herein instead of the commercially available active carbon referred to in the above mentioned application which contains from 1% to 5% ash.

This invention, therefore, has as an object an improved process for carrying out dehydration reactions.

Another object is an improved process for the direct synthesis of amines. Other objects will appear hereinafter.

These objects are accomplished by the following invention, which in its general aspects, comprises passing a vapor or a vapor mixture containing the organic hydroxy compound or compounds to be dehydrated over a heated catalyst comprising substantially ash free active carbon and a suitable dehydrating agent, preferably a dehydrating metallic oxide.

The application of the present invention is of especial importance in the synthesis of amines, wherein a vapor mixture of an alcohol and ammonia, or an amino compound having at least one reactive hydrogen atom attached to nitrogen, is passed over our improved catalyst at an elevated temperature. In the synthesis of amines from alcohols and ammonia, or in syntheses of like character, it is desirable to use a catalyst which will produce substantial yields of amines with a minimum conversion to undesirable side products. There is always a tendency for the alcohol to dehydrogenate to aldehyde and hydrogen instead of to dehydrate with the ammonia to form amines. In addition there is the possibility of a competitive dehydration reaction not involving the ammonia and leading to the formation of ethers or unsaturated hydrocarbons. In the synthesis of methyl amines, where the ether is the only compound that can be formed by this reaction, the difficulty is not serious since dimethyl ether is the equivalent of methanol for the methyl amine synthesis. The higher alcohols, however, tend to form olefines by dehydration and these do not react with ammonia to form amines to any appreciable extent, and therefore the dehydrating side reaction must be suppressed. In our improved process for amine synthesis both the tendency towards dehydrogenation of the alcohols to form aldehydes and hydrogen and the tendency of the higher alcohols to dehydrate to unsaturated hydrocarbons are suppressed. This latter suppression is not true, however, when ammonia or other bases are absent.

We have discovered that the ash content of the carbon used has an important influence on the results obtained which are notably improved when the active carbon is substantially free from ash. In preparting our improved ash free carbon support, we prefer to select as the raw material an activated carbon prepared by the combustion of wood, or nut shells. The activity of the charcoal is improved by heating at high temperatures in the presence of oxygen-containing gases, superheated steam, chlorine, or other activating agents. This product is then treated with acids or other reagents in such manner as to remove largely the inorganic impurities. This purified carbon is then impregnated with a suitable dehydrating agent, preferably a dehydrating oxide. For the production of dehydration products the highly purified impregnated active carbon obtainable by the method indicated, is heated to a suitable reaction temperature and the organic compound, or mixture of organic compounds, in vapor form is passed over the heated catalyst. Thus, a vapor mixture of ammonia and alcohol react with the elimination of water and the formation of primary, secondary and tertiary aliphatic amines. For a more detailed description of the methods by which our invention may be practiced, reference may be had to the following examples which are given by way of illustration and not as limitation.

Example 1

One hundred and twenty-five cc. of activated charcoal weighing 60.8 grams and containing 1.1% ash was alternately digested with 40% nitric acid and washed with distilled water until it gave no flame test for sodium. It then contained only 0.2% ash. The purified activated charcoal was exhausted at a pressure less than 5 mm. for four hours at 400° C. After cooling to room temperature under vacuum the charcoal was covered with 125 cc. of a solution containing 20 grams of crystallized aluminum nitrate per 100 cc. After allowing to stand for several hours the excess solution was decanted off and the carbon dried at 100° C. It was then heated in a loosely covered vessel at 400° C. for four hours in order to convert the aluminum nitrate into aluminum oxide. The alumina content of the carbon catalyst after impregnation was 3.3%.

In applying this catalyst to the synthesis of butylamines 50 cc. was loaded into a tube which was heated to 325° C. and a mixture of normal butanol vapor and ammonia was passed over the catalyst at the rate of 40 cc. of liquid butanol and 23 grams of anhydrous ammonia per hour. After a four hour run the excess ammonia was removed from the product by boiling through an efficient fractionating column and the product analyzed by fractional distillation. It was found that the condensate contained, in addition to a quantity of unconverted butanol, mono-, di- and tributylamines, corresponding to a 13.0% conversion to monobutylamine and a 32.6% conversion to the di- and triamines, or a total conversion to butylamines of 45.6%. Losses to gases amounted to only 3.0%.

*Example 2*

One hundred and twenty-five cc. of active charcoal containing 2.5% ash was washed alternately with 50% nitric acid, 35% hydrochloric acid and distilled water until its ash content was reduced to 0.2%. This purified active charcoal was then impregnated with aluminum oxide by the method of Example 1 using a solution of aluminum nitrate containing 50 grams of crystallized aluminum nitrate per 100 cc. of solution. The finished catalyst contained 13.3% of aluminum oxide. When used for the synthesis of butylamines under the conditions of Example 1, this catalyst gave a conversion of 17.9% to monobutylamine and 28.8% to the di- and triamines, giving a total of 46.7% conversion to butylamines. Losses to gases were only 4.2% of the butanol used.

*Example 3*

Two hundred and fifty cc. of activated charcoal containing 3.2% ash was extracted with strong nitric and hydrochloric acid and washed with water until its ash content was reduced to 0.31%. This purified activated charcoal was impregnated with aluminum oxide by the method of Example 1 using a solution of aluminum nitrate containing 20 grams of crystallized aluminum nitrate per 100 cc. of solution. After ignition to convert the aluminum nitrate to aluminum oxide this catalyst was again impregnated by the method of Example 1, using the same concentration of aluminum nitrate. The finished catalyst contained 8.2% of aluminum oxide. Twenty cc. of this catalyst was heated in a tube furnace to 403° C. and an equimolecular mixture of methanol vapor and ammonia was passed therethrough at the rate of 20 cc. of liquid methanol per hour. Thirty-seven per cent of the methanol was converted to a mixture of mono-, di-, and tri-methylamines. Twelve per cent of the methanol was converted to dimethyl ether and 6% was decomposed with the formation of hydrogen and carbon monoxide.

We prefer to use charcoal prepared from nut shells as the initial material for our improved carbon supports, but carbons prepared by the special combustion of wood or by the dehydration of furfural or carbohydrates may also be used. The carbons should have a rigid and porous structure and should preferably, though not necessarily, contain less than 10% of ash. "Active carbon" as well understood by those skilled in the art, refers to carbon having a greatly increased surface extension on account of its high degree of porosity as compared to ordinary or inactive carbon.

Among the various commercial methods used for the production of active carbon, which forms the raw material for the production of our improved ash free carbon catalyst, there may be mentioned the treatment of the charcoal with steam at about 900° C. which oxidizes the hydrocarbons within the charcoal thereby leaving it in a highly porous and more active state.

A variety of methods may be used for the preparation of the impregnated charcoal such as treating the charcoal with a soluble salt of the metal followed by a precipitating agent, or soaking the charcoal in a colloidal solution or in any other suitable way. We prefer, however, to use the vacuum impregnation method claimed in application Serial No. 470,219, filed July 23, 1930 by Wilbur A. Lazier and H. R. Arnold which has matured into U. S. Patent No. 1,939,647, dated December 19, 1933.

Various methods may be used for lowering the ash content of the active charcoals used as catalyst supports. Extractions with various acids under a variety of conditions have proved effective. The charcoal to be treated may be soaked with concentrated or dilute acids either hot or cold. The extraction may be carried out in a vacuum in order to facilitate contact of the carbon surface with the extracting medium. A very efficacious method was found to consist of boiling the acids under a reflux condenser and allowing the pure distilled and condensed acids to flow over the charcoal contained in a porous cup. We have employed hydrochloric acid, nitric acid, aqua regia, and a mixture of hydrofluoric and hydrochloric acids. Other acids may also be used such as strong organic acids which have a solvent action on hydrocarbons as well as inorganic matter. It is possible by our method of extraction to obtain active carbon catalysts having an ash content as low as 0.05%, a substantially negligible amount. While our invention comprehends the use of active carbon having an ash content up to 1%, it is preferred to conduct the extraction so that the ash content will not be greater than about 0.5%. The carbon may be alternately digested with acid and washed with water or it may be soaked for a long time in acid and the acid then washed out with water or other suitable liquid.

In addition to the alumina mentioned in the examples, other suitable catalytic dehydrating agents such as thoria, titania, various salts, and certain rare earth oxides, may also be used. Various phosphates and sulfates have been found to give small, though definite conversions. In some instances an agent may cause a high conversion of one alcohol into the corresponding amine while yielding a much less satisfactory conversion for another alcohol. Thus, aluminum phosphate or sulfate, while causing a high conversion of methanol to methylamine, is less suitable for the production of butylamine. It is to be understood, however, that the present invention resides in the discovery of the advantages resulting from the use of a catalyst comprising any suitable dehydrating agent mounted on a substantially ash-free active carbon support as herein described, rather than in the selection of a particular dehydrating agent to be used with our improved carbon support. The percentage of oxides used on the surface of the carbon support may vary over wide limits. For example, from 1% to 10% of alumina on the charcoal may be used, but we prefer to use 7% to 9%.

The conditions of conducting the reaction with our improved catalyst may be widely varied. Temperatures of about 325° C. have been indicated in the examples, but these may be varied as the individual case permits. Rates of flow may also be varied over a wide range. Ammonia is preferably used in excess of the amount theoretically required to react with the alcohol, but this, too, is not a rigid requirement. Our improved catalysts are applicable when the process is conducted at ordinary, reduced, or superatmospheric pressures. In the case of the higher boiling alcohols, it may be desirable to conduct the process in a partial vacuum, while for the more volatile alcohols, increase in time of contact is gained through the use of pressure.

The impregnated carbon catalysts set forth herein may be employed for the direct synthesis of aliphatic and aromatic amines. For example, they are suitable for the preparation from methanol and ammonia of the various methylamines and for other aliphatic amines from ammonia and the corresponding alcohols such as ethylamines, propylamines, butylamines, hexylamines, and laurylamines. This particular catalyst, however, is especially useful for the synthesis of amines having more than one carbon atom in the alkyl group inasmuch as the dehydration tendencies of the alcohols are suppressed. Aromatic amines may be produced in the same manner as the aliphatic amines by using phenols instead of aliphatic alcohols. Thus, a mixture of ammonia and phenol yields aniline. Secondary, tertiary, or mixed amines having different hydrocarbon groups may also be produced by reacting a primary or secondary amine with an alcohol. The present process is useful for the alkylation of aromatic amines; for example, in the conversion of aniline to ethyl aniline by reacting aniline with ethyl alcohol. Amino compounds of polyhydric alcohols, such as glycerol, may be prepared by reacting the polyhydric alcohol with ammonia or an amine. Our improved process for synthesizing amines includes, therefore, the reaction of amino compounds containing at least one reactive hydrogen atom attached to nitrogen with alcohols. The term "amino" as used herein in connection with the material passed over the catalyst refers therefore to a compound having an $NH_2$ or $NH$ group, and includes primary and secondary amines as well as ammonia. Thus, primary, secondary and tertiary amines may be produced by our improved process. The scope of the invention is intended to include both aliphatic alcohols and phenols.

While our improved process is especially valuable for the production of amines, it is to be understood that in its broadest aspect the invention comprises the dehydration of organic hydroxy compounds for the production of dehydration products without the concomitant production of dehydrogenation products in undesirable amounts. Among the many dehydration reactions which may be carried out by our invention are the following: The dehydration of a mixture of alcohol and acid for the production of an ester, as for instance the formation of ethyl acetate from ethyl alcohol and acetic acid; the conversion of alcohols to the corresponding ethers, as for instance, methyl ether from methyl alcohol; the production in the absence of ammonia of olefines from the higher alcohols; the dehydration of an acid for the production of an anhydride, as for instance acetic anhydride from acetic acid; and the formation of inner anhydrides, as for example the dehydration of an acid molecule such as of acetic acid for the production of ketene. For the purpose of the present invention ethers, (alcohols having the hydrogen of the hydroxyl group replaced by an alkyl group), may be considered as substituted alcohols or hydroxy compounds. Thus, dimethyl ether and ammonia may, by means of our improved catalyst, be made to react to form amines.

In certain reactions, such as the preparation of amines from alcohols and ammonia, the presence of relatively small amounts of inorganic impurities often leads to troublesome side reactions and consequently renders carbon containing such impurities unfit for use. The use of the present invention in removing the impurities before impregnation greatly enlarges the field from which carbons for catalyst preparation may be chosen. Our improved catalysts may be used with advantage because of the high conversions to amines obtained. In addition these catalysts are specially valuable because of the low loss to side products obtained by their use. For example, in the use of an alumina impregnated carbon catalyst, made from carbon containing 1.1% ash, for the preparation of butylamines from butanol and ammonia under the conditions of flow of Example 1, it is necessary to raise the temperature to 380° C. to obtain a conversion of 45% of the butanol to amines. At this temperature about 20% of the butanol is lost as butylene and butane. On the other hand, a catalyst made from the same carbon after extraction to remove most of the ash will give conversion of 45% to amines and only 3% to gases at 325° C. As a further illustration of the improved results accruing from the purification of the carbon, it may be noted that the reaction set forth in Example 1, when carried out with the original carbon without purification, using the identical impregnation methods, yielded a conversion of 5.3% to monobutylamine and 14.5% to the di- and triamines, or a total to butylamines of only 19.8%, with gas losses amounting to 3.1%. It will be seen, therefore, that our improved substantially ash free catalyst shows a conversion of about two and one-half times that of a catalyst comprised of carbon having an ash content as low as 1.1%.

As many apparently widely different embodiments of this invention may be made without departing from the spirit and scope thereof, it is to be understood that we do not limit ourselves to the specific embodiments thereof except as defined in the appended claims.

We claim:

1. In the process of producing amino compounds by passing the mixed vapors of an organic hydroxy compound of the class consisting of alcohols and phenols and an amino compound having at least one hydrogen atom attached to nitrogen over a heated catalyst, the improvement which consists in passing said vapors over a catalyst comprising essentially a dehydrating metal oxide and active carbon containing less than 1% ash.

2. The process according to claim 1, characterized in that the dehydrating metal oxide is aluminum oxide.

3. In the process of producing amino compounds by passing the mixed vapors of an organic hydroxy compound of the class consisting of alcohols and phenols and an amino compound having at least one hydrogen atom attached to nitrogen over a heated catalyst, the improvement which consists in passing said vapors over a catalyst prepared by extracting ash from active carbon with acid and then impregnating the treated carbon with a dehydrating metal oxide.

4. The process according to claim 3, characterized in that the dehydrating metal oxide is aluminum oxide.

5. In the process of producing amino compounds by passing the mixed vapors of a monohydric alcohol and an amino compound having at least one hydrogen atom attached to nitrogen over a heated catalyst, the improvement which consists in passing said vapors over a catalyst comprising essentially a dehydrating metal oxide and active carbon containing less than 1% ash.

6. In the process of producing amino compounds by passing the mixed vapors of a monohydric alcohol and an amino compound having at least one hydrogen atom attached to nitrogen over a heated catalyst, the improvement which consists in passing said vapors over a catalyst prepared by extracting ash from active carbon with acid and impregnating the treated carbon with a dehydrating metal oxide.

7. In the process of producing amines by passing the mixed vapors of a monohydric alcohol and ammonia over a heated catalyst, the improvement which consists in passing said vapors over a catalyst comprising essentially a dehydrating metal oxide and active carbon containing less than 1% ash.

8. In the process of producing amines by passing the mixed vapors of a monohydric alcohol and ammonia over a heated catalyst, the improvement which consists in passing said vapors over a catalyst prepared by extracting ash from active carbon with acid and impregnating the treated carbon with a dehydrating metal oxide.

9. In the process of producing amines by passing the vapors of an aliphatic monohydric alcohol and ammonia over a heated catalyst, the improvement which consists in passing said vapors over a catalyst comprising essentially a dehydrating metal oxide and active carbon containing less than 1% ash.

10. The process according to claim 9, characterized in that the dehydrating metal oxide is aluminum oxide.

11. In the process of producing amines by passing the mixed vapors of an aliphatic monohydric alcohol and ammonia over a heated catalyst, the improvement which consists in passing said vapors over a catalyst prepared by extracting ash from active carbon with acid and impregnating the treated carbon with a dehydrating metal oxide.

12. The process according to claim 11, characterized in that the dehydrating metal oxide is aluminum oxide.

13. In the process of producing butyl amines by passing the mixed vapors of a butyl alcohol and ammonia over a heated catalyst, the improvement which consists in passing said vapors over a catalyst comprising essentially a dehydrating metal oxide and active carbon containing less than 1% ash.

14. The process according to claim 13, characterized in that the dehydrating metal oxide is aluminum oxide.

15. In the process of producing butyl amines by passing the mixed vapors of a butyl alcohol and ammonia over a heated catalyst, the improvement which consists in passing said vapors over a catalyst prepared by extracting ash from active carbon with acid and impregnating the treated carbon with a dehydrating metal oxide.

16. The process according to claim 15, characterized in that the dehydrating metal oxide is aluminum oxide.

17. In the process of producing methylamine by passing the mixed vapors of methyl alcohol and ammonia over a heated catalyst, the improvement which consists in passing said vapors over a catalyst comprising essentially a dehydrating metal oxide and active carbon containing less than 1% ash.

18. The process according to claim 17, characterized in that the dehydrating metal oxide is aluminum oxide.

19. In the process of producing methylamine by passing the mixed vapors of methyl alcohol and ammonia over a heated catalyst, the improvement which comprises passing said vapors over a catalyst prepared by extracting ash from active carbon and impregnating the said carbon with a dehydrating metal oxide.

20. The process according to claim 19, characterized in that the dehydrating metal oxide is aluminum oxide.

HERRICK RANSOM ARNOLD.
THOMAS LEIGH WILLIAMS.